US012673331B2

(12) United States Patent
Socransky

(10) Patent No.: US 12,673,331 B2
(45) Date of Patent: Jul. 7, 2026

(54) SYSTEM AND METHOD FOR RECYCLING PLASTICS

(71) Applicant: Alexander Socransky, Los Angeles, CA (US)

(72) Inventor: Alexander Socransky, Los Angeles, CA (US)

( * ) Notice: Subject to any disclaimer, the term of this patent is extended or adjusted under 35 U.S.C. 154(b) by 333 days.

(21) Appl. No.: 18/377,286

(22) Filed: Oct. 5, 2023

(65) Prior Publication Data

US 2024/0198356 A1 Jun. 20, 2024

Related U.S. Application Data

(60) Provisional application No. 63/413,940, filed on Oct. 6, 2022.

(51) Int. Cl.
| | |
|---|---|
| *B03B 9/06* | (2006.01) |
| *B03B 1/00* | (2006.01) |
| *B03B 5/30* | (2006.01) |
| *B03B 5/60* | (2006.01) |
| *B03C 1/30* | (2006.01) |
| *C08J 11/10* | (2006.01) |
| *C10G 1/10* | (2006.01) |
| *C10J 3/72* | (2006.01) |

(52) U.S. Cl.
CPC ................. *B03B 9/06* (2013.01); *B03B 1/00* (2013.01); *B03B 5/30* (2013.01); *B03B 5/60* (2013.01); *B03C 1/30* (2013.01); *C08J 11/10* (2013.01); *C10G 1/10* (2013.01); *C10J 3/72* (2013.01); *B03C 2201/20* (2013.01); *C08J* *2300/30* (2013.01); *C10G 2300/1003* (2013.01); *C10J 2300/0906* (2013.01); *C10J 2300/0946* (2013.01)

(58) Field of Classification Search
CPC .... B03B 9/06; B03B 1/00; B03B 5/30; B03B 5/60; B03C 1/30; B03C 2201/20; C08J 11/10; C08J 2300/30; C08J 2300/00; C08J 11/12; C10G 1/10; C10G 2300/1003; C10J 3/72; C10J 2300/0906; C10J 2300/0946; C10B 53/07; Y02W 30/62
See application file for complete search history.

(56) References Cited

U.S. PATENT DOCUMENTS

2024/0025086 A1* 1/2024 Valerio ................... B03B 9/061

* cited by examiner

*Primary Examiner* — Randy Boyer
*Assistant Examiner* — Juan C Valencia
(74) *Attorney, Agent, or Firm* — Olivo IP Law Group, P.C.; John W. Olivo, Jr.

(57) ABSTRACT

The present invention is a process of recycling plastics based on eliminating the need to pre-sort different plastic materials and using physics to separate plastic particles based on the gravitational weight of those particles. Plastics are grounded down into very small pellets using a uniform pressure cylinder with dimples. Then, the small plastic pellets are separated using a float-sink method. Using the float-sink separation method, the plastics can be lifted and organized by density and by gravitational weight from lower densities to higher densities using different gases or liquids with different gravity weights or densities.

20 Claims, 4 Drawing Sheets

SYSTEM AND METHOD FOR RECYCLING PLASTICS

CROSS REFERENCE TO RELATED APPLICATIONS

This application claims the benefit of U.S. Provisional Application Ser. No. 63/413,940, filed on Oct. 6, 2022, the contents of which are incorporated herein.

BACKGROUND OF THE INVENTION

This invention relates to a new and improved way to recycle plastic materials. Plastic recycling is the process of recovering scrap or waste plastic and reprocessing the material into useful products. Since the vast majority of plastic materials are non-biodegradable, recycling is necessary to reduce the amount of plastic waste.

There are two types of plastics: thermosets and thermoplastics. Thermoplastics are plastics that can be re-melted and re-molded into new products, and therefore, recycled. Thermoset plastics contain polymers that cross-link to form an irreversible chemical bond, meaning that no matter how much heat you apply, they cannot be re-melted into a new material and hence, non-recyclable.

When different types of plastics are melted together, they tend to phase-separate, like oil and water, and set in layers. The phase boundaries cause structural weakness in the resulting material, meaning that polymer blends are useful in only limited applications. The two most widely manufactured plastics, polypropylene and polyethylene, behave in this way which limits their utility for recycling. Each time plastic is recycled, additional virgin materials must be added to help improve the integrity of the material. Therefore, even recycled plastic has new plastic material added in. The same piece of plastic can only be recycled approximately 2-3 times before its quality decreases to the point where it can no longer be used.

Before any plastic waste is recycled, it needs to go through five different stages so that it can be further used to make various types of products. The first stage is sorting, where every plastic item is separated according to its make and type so that it can be processed accordingly in the shredding machine. The next stage is washing, where the sorted plastic waste is washed properly to remove impurities such as labels and adhesives in order to enhance the quality of the finished product. The third stage is shredding, where the washed plastic waste is loaded into different conveyer belts that run the waste through the different shredders. These shredders tear up the plastic into small pellets, preparing them for recycling into other products. Once the plastic waste has been shredded, the next stage is to identify and classify the plastic. After shredding, a proper testing of the plastic pellets is conducted in order to ascertain the quality and class. The final stage is extruding, which involves melting the shredded plastic so that it can be extruded into pellets, which are then used for making different types of plastic products.

Although there are many different methods of recycling plastic waste, the two most commonly used methods are heat compression and monomer. The heat compression method has the ability to recycle all types of plastic at once. It takes unsorted and cleaned plastic waste and mixes it in large tumblers that churn the entire mixture. The major advantage of this process is that it does not require matching forms of plastic to be recycled together. The monomer method works by reversing the polymerization reaction in order to recycle the same type of condensed polymer. This process not only purifies but also cleans the plastic waste to create a new polymer.

Additional recycling methods, such as chemical recycling, pyrolysis, and gasification, are used to turn plastic polymers back into individual monomers, thereby allowing materials to be reused in a variety of ways. In these processes, the chemical building blocks that make up the recycled plastic are recovered. The fundamental building blocks can, in some cases, be repolymerized endlessly, giving them the qualities of brand-new, or virgin, resin. The transformation can occur through a variety of processes, all of which avoid combustion, or burning, of plastics.

Chemical recycling is any process by which a polymer is chemically reduced to its original monomer form so that it can eventually be reprocessed (repolymerized) and made into new plastic materials that go on to be new plastic products. Chemical recycling helps to overcome the limits of traditional recycling. It also helps manufacturers continue to push the boundaries of how, and where, recycled plastics can be used. Chemical recycling has long been used for nylons, and the industry is working to make it possible for other resin types.

Pyrolysis, sometimes referred to as "plastics to fuel," turns non-recycled plastics from the municipal solid waste into a synthetic crude oil that can be refined into diesel fuel, gasoline, heating oil, or waxes. Using pyrolysis to convert non-recycled plastics into ultra-low sulfur diesel (ULSD) fuel reduces greenhouse gas emissions by 14% and water consumption by 58%, and it saves up to 96% in traditional energy as opposed to ULSD from conventional crude oil.

Gasification turns non-recycled materials from municipal solid waste into a synthetic gas, or "syngas," which can be used for electric power generation or converted into fuel or chemical feedstocks, such as ethanol and methanol, some of which can also be used to make new plastics that go into consumer products.

SUMMARY OF THE INVENTION

The present invention is an ovel process for recycling plastics based on eliminating the need to pre-sort different plastic materials and using physics by means to separate plastic particles based on the gravitational weight of the particles. First, the plastics are ground down into very small pellets using a uniform pressure cylinder with dimples of the same uniform diameter. Then, the small plastic pellets are separated using a float-sink separation technique. Using the float-sink separation method, the plastics can be lifted using different variations of gases, ultrasonics, or electromagnetics with different gravity weights. Or, by using a fluid that has a density higher than the materials, making it possible for less dense material to float and for more dense material to sink.

An additional sorting method can be achieved by adding a gas or heat to change the specific weight or density of the levitating matter. This would involve using a gas in the liquid to add a lower gravity weight, therefore raising the plastic by gravity weight, and adding a skimmer to the top to remove the pellets that rise to the top. Through knowledge of the size and weight of the pellets in the separating machines, as well as the volume of the number of plastic pellets used, it is possible to achieve separation using either gas, liquid, or ultrasonic methods. The ultrasonic method of separation uses sound waves to lift, levitate, and move around specific particles.

Different plastic particles have different specific gravities. Once recyclable plastic materials have been hydraulically pressed into the same pellet sizes, these hydraulically formed plastic pellets are then easily divided by weight, and they are skimmed along the top of the compression tank. This results in all plastic particles that have the same weight being grouped together without having to go through the pre-sorting process.

These and other aspects, objects, features and advantages of the present invention are, specifically set forth in, or will become apparent from, the following detailed description of an exemplary embodiment of the invention.

DETAILED DESCRIPTION OF THE PREFERRED EMBODIMENT

Figure 1:
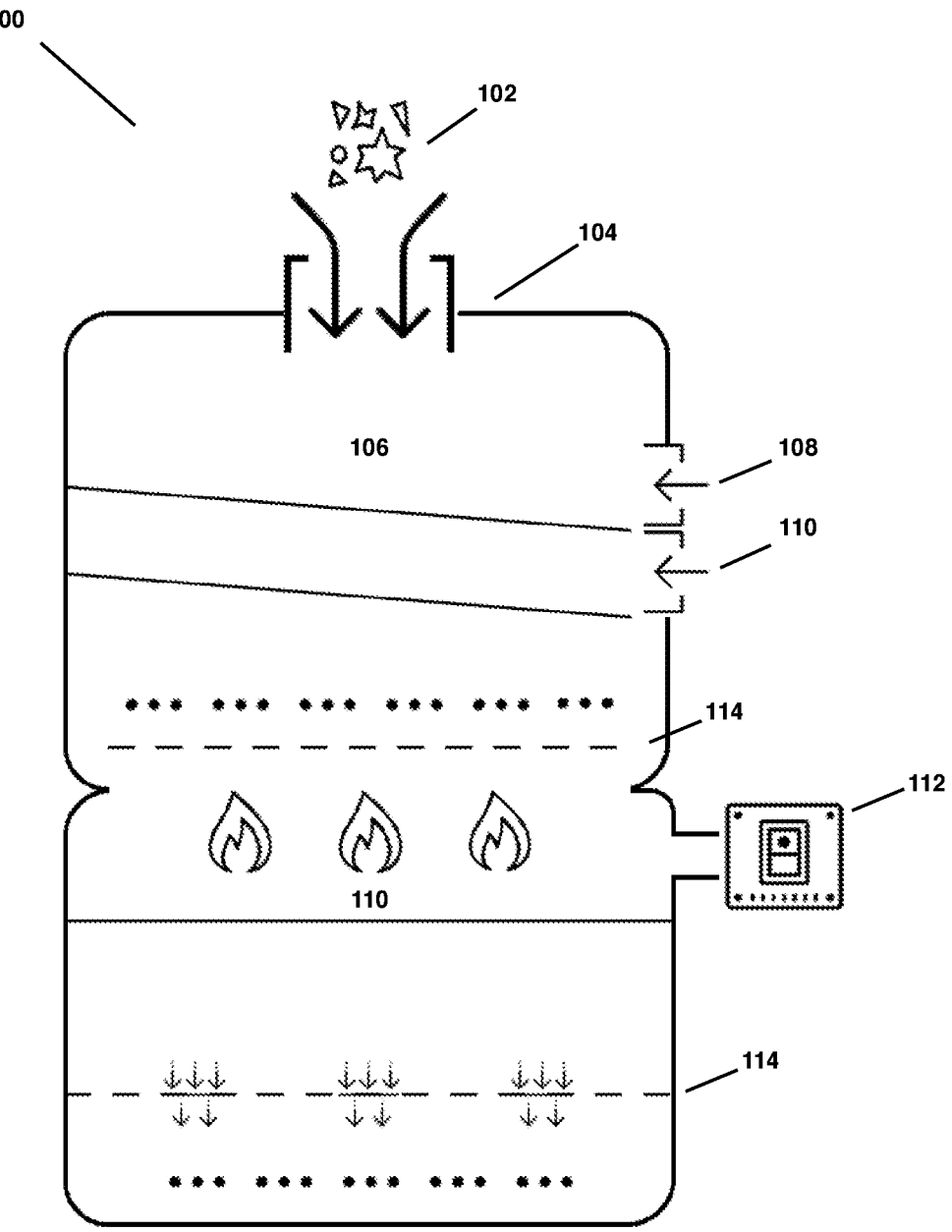
FIG. 1 is a diagram of the system of the present invention.

FIG. 1 is a diagram of the process 100 of the present invention. In accordance with the preferred embodiment of the present invention, each plastic item 102 enters a hydraulic compartment 106 of the present invention 104 where it is hydraulically pressed into small equally sized pellets. These small pellets of various plastic material are fed into a tank compressor that is also filled with a liquid and/or gas 110. The tank compressor is controlled and monitored by panel 112. Hydrogen or another gas may be added via vents 108 and 110 to alter the buoyancy of the liquid in order to separate the plastics by weight. As the plastics are hydraulically stamped into uniformly sized pellets, the weight of each type of polymer can be separated easily via a float-sink method in which various liquids and/or gases are used to separate the pellets based on their weight or density. In one example of the preferred embodiment, a saltwater mixture is used for the separation. In an alternative example, hydrogen gas is used for the separation.

Figure 2:
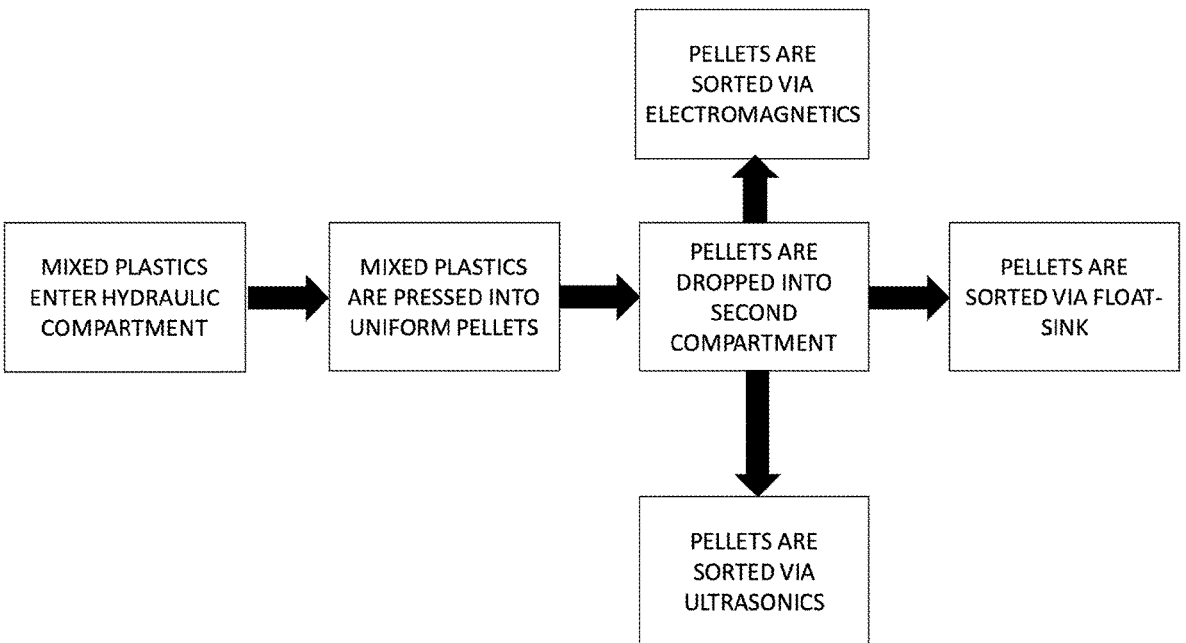
FIG. 2 is a flow chart of the method of the present invention.

FIG. 2 is a flow chart of the method of the present invention. In accordance with the preferred embodiment of the present invention, mixed plastics enter the first compartment of the chamber, where they are hydraulically pressed into uniform plastic pellets. In alternative embodiments, the pellets are formed via melting and cooling or other extrusion methods. Once the uniform plastic pellets are formed, they are sorted. The plastic pellets may be sorted via a float-sink method in which they are dropped into a second compartment of the chamber which is a tank compressor. In the second compartment, the uniform plastic pellets are sorted by density or weight using a float-sink method. This allows for heavier or more dense plastic pellets to sink to the bottom of a liquid, gas, or mixture of the two while the lighter or less dense pellets remain near the surface of the liquid, gas, or mixture of the two. The plastic pellets may also be sorted via ultrasonics or electromagnetics. Ultrasonic sorting involves the use of sound waves to vibrate or levitate the pellets with lower weights or densities. Electromagnitic sorting is similar to ultrasonic sorting, with the use of electromagnetic waves in place of the sound waves.

Figure 3:
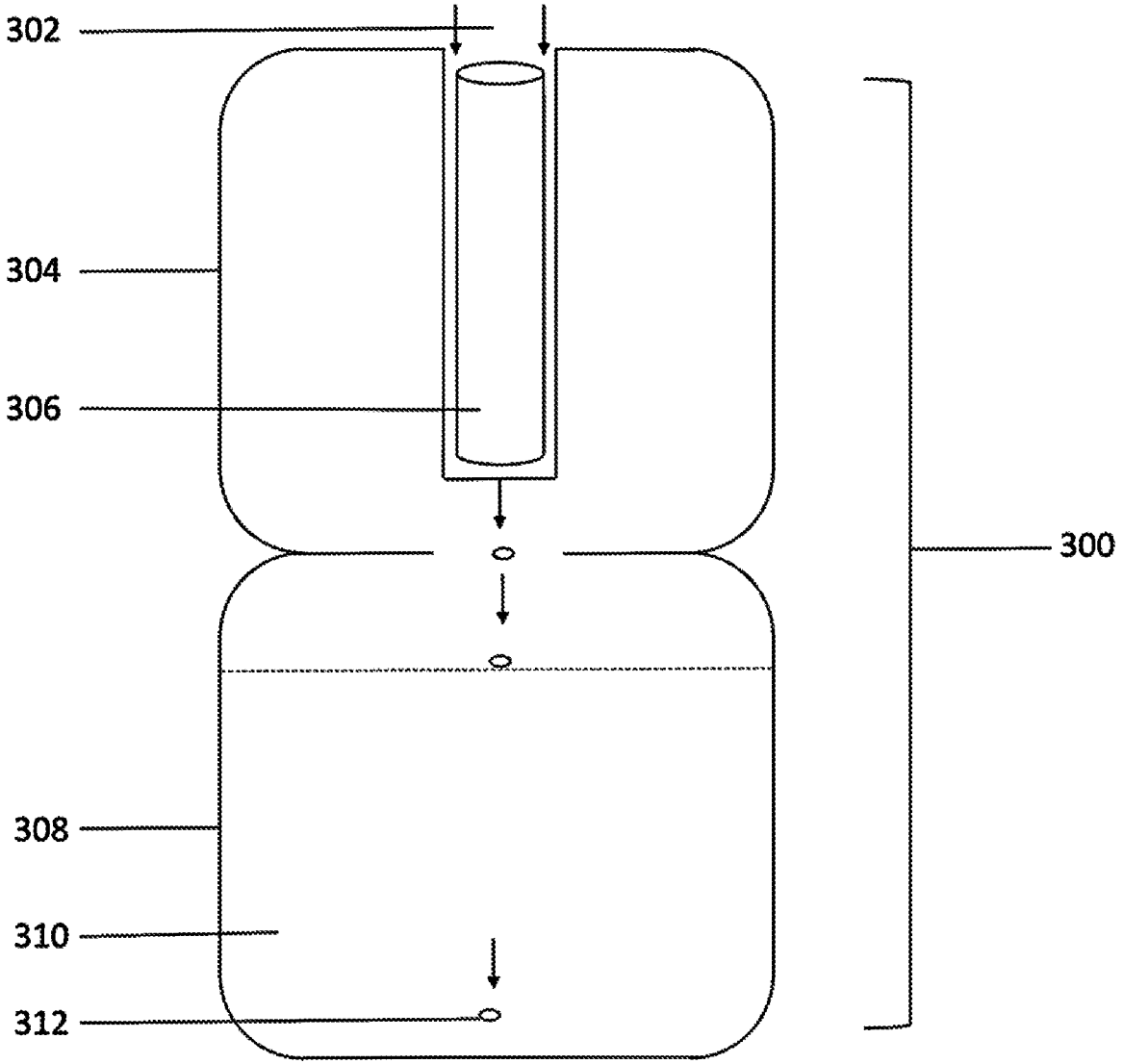
FIG. 3 is an alternative diagram of the system of the present invention.

FIG. 3 is an alternative diagram of the system of the present invention. In accordance with the preferred embodiment of the present invention, the system 300 consists of two compartments of a larger chamber. In the first compartment 304, an opening 302 allows mixed plastics to enter the compartment where they are hydraulically pressed into uniform plastic pellets 312 via the hydraulic press 306 and a plurality of uniform apertures. The pellets then enter the second compartment tank compressor 308, where they are separated via a float-sink method within a liquid, gas, or mixture of liquid and gas 310. The sorted plastic pellets are then retrieved, either skimmed from the surface or collected from the bottom of the compartment, and further processed and recycled.

Figure 4:
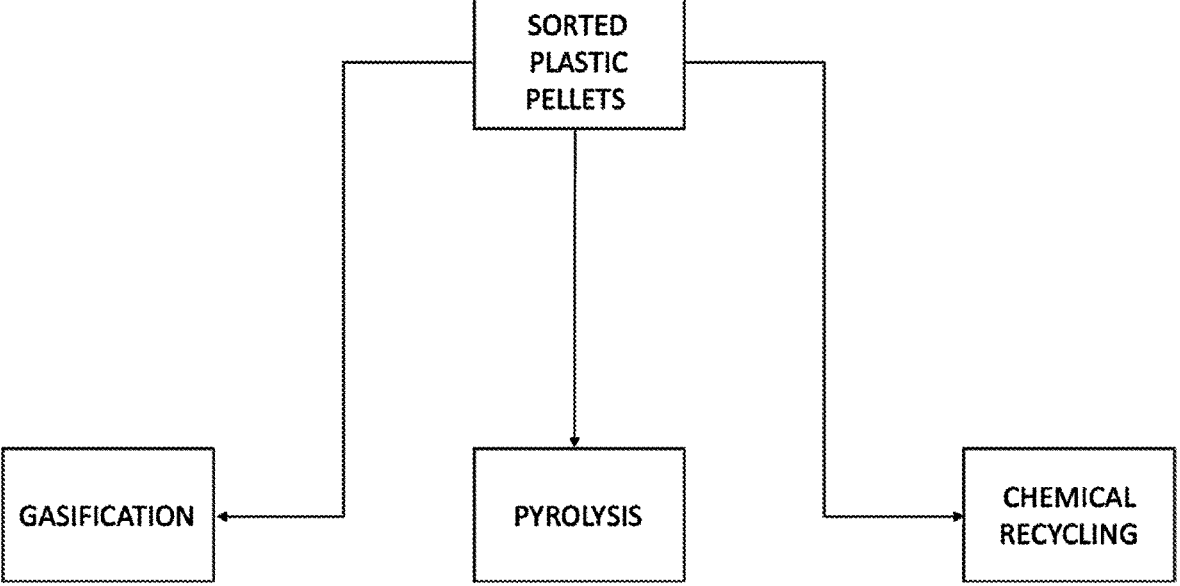
FIG. 4 is a flow chart depicting the potential recycling routes of the present invention.

FIG. 4 is a flow chart depicting the potential recycling routes of the present invention. In accordance with the preferred embodiment of the present invention, the sorted uniform plastic pellets are further processed and recycled into new plastic materials. The recycling methods employed may vary, with the most common recycling methods being pyrolysis, gasification, and chemical recycling. Chemical recycling is any process by which a polymer is chemically reduced to its original monomer form so that it can eventually be reprocessed (repolymerized) and made into new plastic materials that go on to be new plastic products. Pyrolysis, sometimes referred to as "plastics to fuel," turns non-recycled plastics from the municipal solid waste into a synthetic crude oil that can be refined into diesel fuel, gasoline, heating oil, or waxes. Gasification turns non-recycled materials from municipal solid waste into a synthetic gas, or "syngas," which can be used for electric power generation or converted into fuel or chemical feedstocks, such as ethanol and methanol, some of which can also be used to make new plastics that go into consumer products.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations. Indeed, it will be apparent to one of skill in the art how alternative functional, logical, or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of the described embodiment. Thus, the breadth and scope of the technology disclosed herein should not be limited by any of the above-described exemplary embodiments.

Terms and phrases in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as: conventional," "traditional," "normal," "standard," "known," and terms of similar meaning should not be construed as limiting the item described to a given time period or to an item available as of a given time, but instead should be ready to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A system for sorting and recycling a plurality of plastic materials, said system comprising:
a chamber consisting of a first compartment and a second compartment, wherein said first compartment is configured to receive said plurality of plastic materials and press said plurality of plastic materials into a plurality of uniform plastic pellets via a hydraulic press and a plurality of uniform apertures through which said plurality of plastic materials is extruded, and wherein said second compartment is configured to receive said plurality of uniform plastic pellets from said first compartment and sort said plurality of uniform plastic pellets based on a plurality of densities associated with said plurality of uniform plastic pellets via a float-sink separation comprising of a liquid contained within said second compartment, and wherein a sorted plurality of uniform plastic pellets are further processed and recycled into a plurality of new plastic materials.

2. The system of claim 1, wherein said liquid contained within said second compartment of said chamber is replaced with a gas.

3. The system of claim 1, wherein a gas is added to said second compartment of said chamber to further aid in said float-sing separation of said plurality of uniform plastic pellets.

4. The system of claim 1, wherein ultrasonics are used in place of said float-sink separation in order to sort said plurality of uniform plastic pellets.

5. The system of claim 1, wherein electromagnetics are used in place of said float-sink separation in order to sort said plurality of uniform plastic pellets.

6. The system of claim 1, wherein a portion of said plurality of uniform plastic pellets with lower densities are skimmed from a surface of said liquid.

7. The system of claim 1, wherein a portion of said plurality of uniform plastic pellets with higher densities are retrieved from a bottom of said second compartment.

8. The system of claim 1, wherein said sorted plurality of uniform plastic pellets undergo chemical recycling.

9. The system of claim 1, wherein said sorted plurality of uniform plastic pellets undergo pyrolysis.

10. The system of claim 1, wherein said sorted plurality of uniform plastic pellets undergo gasification.

11. A method for sorting and recycling a plurality of plastic materials, said method comprising:
receiving, via a first compartment of a two-compartment chamber, said plurality of plastic materials;
pressing, via a hydraulic press contained within said first compartment, said plurality of plastic materials through a plurality of uniform apertures;
extruding a plurality of uniform plastic pellets from said plurality of uniform apertures;
sorting, via a float-sink density separation, said plurality of uniform plastic pellets; and
processing and recycling said plurality of uniform plastic pellets into a plurality of new plastic materials.

12. The method of claim 11, wherein at least one liquid contained within said second compartment of said chamber is used for said float-sink separation.

13. The method of claim 11, wherein at least one gas contained within said second compartment of said chamber is used for said float-sink separation.

14. The method of claim 11, wherein ultrasonics are used in place of said float-sink separation in order to sort said plurality of uniform plastic pellets.

15. The system of claim 1, wherein electromagnetics is used in place of said float-sink separation in order to sort said plurality of uniform plastic pellets.

16. The method of claim 11, wherein a portion of said plurality of uniform plastic pellets with lower densities are skimmed from a surface of a liquid.

17. The method of claim 11, wherein a portion of said plurality of uniform plastic pellets with higher densities are retrieved from a bottom of said second compartment.

18. The method of claim 11, wherein said sorted plurality of uniform plastic pellets undergo chemical recycling.

19. The method of claim 11, wherein said sorted plurality of uniform plastic pellets undergo pyrolysis.

20. The method of claim 11, wherein said sorted plurality of uniform plastic pellets undergo gasification.

* * * * *